United States Patent [19]

Lewis et al.

[11] Patent Number: 5,015,691
[45] Date of Patent: May 14, 1991

[54] ONE PART HEAT CURABLE ORGANOPOLYSILOXANE COMPOSITIONS

[75] Inventors: Larry N. Lewis, Scotia; Tony C. Chang, Clifton Park, both of N.Y.

[73] Assignee: General Electric Company, Schenectady, N.Y.

[21] Appl. No.: 354,557

[22] Filed: May 22, 1989

[51] Int. Cl.$^5$ .............................................. C08F 8/00
[52] U.S. Cl. ..................................... 525/100; 525/106; 525/478; 525/487; 525/472; 525/474; 528/15; 528/31; 528/32
[58] Field of Search ............... 525/478, 100, 472, 474, 525/487, 106; 528/15, 31, 32

[56] References Cited

U.S. PATENT DOCUMENTS

| | | | |
|---|---|---|---|
| 3,284,406 | 11/1966 | Nelson | 260/46.5 |
| 3,419,593 | 12/1968 | Willing | 260/448.2 |
| 3,859,228 | 1/1975 | Morishita et al. | 252/316 |
| 3,886,084 | 5/1975 | Vassiliades | 252/316 |
| 4,293,677 | 10/1981 | Imai | 528/15 |
| 4,329,274 | 5/1982 | Faltynek | 524/862 |
| 4,411,933 | 10/1983 | Samejima et al. | 427/213.3 |
| 4,462,982 | 7/1984 | Samejima et al. | 424/35 |
| 4,481,341 | 11/1984 | Schlak et al. | 525/478 |
| 4,528,354 | 7/1985 | McDougal | 528/33 |
| 4,766,176 | 8/1988 | Lee et al. | 528/31 |

*Primary Examiner*—Melvyn I. Marquis
*Attorney, Agent, or Firm*—William A. Teoli; James C. Davis, Jr.; William H. Pittman

[57] ABSTRACT

A one part heat curable organopolysiloxane composition is provided having an olefinically unsaturated organopolysiloxane, and an organohydrogenpolysiloxane, and a platinum catalyst encapsulated in an organic polymer such as a thermoplastic organic polymer, or a thermosetting organic polymer.

10 Claims, No Drawings

ONE PART HEAT CURABLE ORGANOPOLYSILOXANE COMPOSITIONS

BACKGROUND OF THE INVENTION

The present invention relates to one part heat curable organopolysiloxane compositions resulting from a platinum catalyzed addition cure of an olefinically unsaturated organopolysiloxane and organohydrogenpolysiloxane. More particularly the present relates to the use of a microencapsulated platinum catalyst in a one part heat curable organopolysiloxane mixture.

Prior to the present invention, a one part heat curable organopolysiloxane compositions based on the use of a platinum catalyst to effect addition between a silicon hydride and an olefinically unsaturated organopolysiloxane was shown by Imai, U.S. Pat. No. 4,293,677. Although valuable results are achieved by Imai's method, encapsulation of the organohydrogenpolysiloxane, is required. Accordingly, large amounts of an incompatible encapsulating material are required to achieve effective results. The physical properties and optical characteristics of the cured material are often adversely affected.

Schlak et al, U.S. Pat. No. 4,481,341 is directed to a one package heat curable thermosetting organopolysiloxane composition utilizing a platinum catalyst in an organopolysiloxane having at least two olefinically unsaturated hydrocarbon groups attached to silicon, and an organohydrogenpolysiloxane. The platinum catalyst in Schlak's composition is dispersed in bulk in a solid substance such as a silicone resin or polyester resin having a softening point between about 70° C. to 250° C. The platinum containing mass has to be ground prior to its use in the organopolysiloxane mixture. Again, the bulk encapsulant for the platinum catalyst is insoluble in the organopolysiloxane mixture. As a result, the appearance of the cured product also can be adversely affected. In addition, the shelf life of the organopolysiloxane is sometimes unsatisfactory, as the platinum catalyst can be exposed when the bulk encapsulated platinum is ground prior to its incorporation into the one part heat curable organopolysiloxane mixture.

Various procedures have been developed utilizing thermosetting material, such as phenolics, and melamine formaldehyde reaction products, to manufacture minute capsules for encapsulating a variety of materials for different purposes. For example, Hart et al, U.S. Pat. No. 3,755,190 is directed to an encapsulation process using an in-situ polymerization reaction of polyhydroxy phenolic materials with aldehyde materials. Some of the materials which are encapsulated by the aforementioned technique, are water insolubles, inert to the encapsulating materials, such as various oils, for example, olive oil, fish oils, mineral oil, xylene and similar materials. Further improvements in capsule manufacture is shown by Hayford U.S. Pat. No. 4,444,699. A polymerization reaction is effected between melamine and formaldehyde and/or the polycondensation of methylol, or etherified methylol melamine, monomeric methylolmelamine, or etherified methylol melamine, or a low molecular weight polymer thereof. Materials which are encapsulated include a mixture of chromogeneric compounds, such as of 3,3-bis(p-dimethylaminophenol)-6-dimethylaminophthalide), mixed with other materials and dissolved in a mixture of $C_{10}$-$C_{13}$ alkyl benzene and benzylated xylenes.

SUMMARY OF THE INVENTION

It would be desirable to provide a heat curable one part organopolysiloxane composition utilizing an organohydrogenpolysiloxane and an organopolysiloxane having olefinically unsaturated radicals attached to silicon such as alkenyl radicals, for example isopropenyl or vinyl, which are catalyzed by a microencapsulated platinum catalyst. It also would be desirable to provide a one part heat curable organopolysiloxane composition based on a platinum cure which does not require the encapsulation of either of the reactive components of such heat curable one part organopolysiloxane composition, whereby excessive amounts of incompatible encapsulating material are required. In addition, it would also be desirable to provide a one part heat curable organopolysiloxane composition utilizing a platinum catalyst which does not necessitate the employment of an excessive amount of an incompatible resin to totally encapsulate the platinum catalyst in bulk and thereafter have to break-down the intractible mass to effectively disperse the active catalyst.

The present invention is based on the discovery that a heat curable one part organopolysiloxane composition can be made by using a platinum catalyst in a mixture of organohydrogenpolysiloxane and an organopolysiloxane having olefinically unsaturated radicals attached to silicon, where the platinum catalyst has been microencapsulated in an organic resin.

STATEMENT OF THE INVENTION

There is provided by the present invention, a one part heat curable organopolysiloxane composition comprising by weight, (A) 100 parts of an organopolysiloxane having at least two olefinically unsaturated organic radicals attached to silicon, (B) 1 to 20 parts of an organohydrogen polysiloxane, and (C) an effective amount of a platinum catalyst microencapsulated in an organic resin.

Some of the platinum catalysts which can be used in the practice of the present invention to effect addition between silicon hydride and olefinically unsaturated silicon materials are for example chloroplatinic acid, finely divided platinum metal, platinum metal on a carrier, such as carbon, as shown by Daly, U.S. Pat. No. 2,970,150, platinum catalyst as shown by Ashby, U.S. Pat. Nos. 3,159,601 and 3,159,662, Lamoreaux, U.S. Pat. No. 3,220,972 and Karstedt, U.S. Pat. No. 3,775,452, all of which are incorporated herein by reference.

An effective amount of platinum catalyst which is used in the one-part heat curable organopolysiloxane composition is 5 ppm to 200 ppm of Pt, based on the weight of heat curable organopolysiloxane mixture and preferable 10 ppm to 100 ppm.

A preferred method of microencapsulating the platinum catalysts used in the practice of the invention is in accordance with the previously cited encapsulation process of Hart, U.S. Pat. No. 3,755,190 incorporated herein by reference. The microencapsulation of the aforementioned platinum catalysts can be achieved using a thermosetting resin, such as a complex of poly(vinyl alcohol) and a polyhydroxy phenol, which complex is soluble in an aqueous capsule manufacturing vehicle. An aqueous solution of the complex is subjected to reaction with an aldehyde, and the polyhydroxy phenol is condensed with the aldehyde to yield a separate liquid phase which is concentrated. Encapsulation of the platinum catalyst can be achieved by forming a single phase aqueous solution of the complex and the aldehyde and dispersing the platinum catalyst into the single phase aqueous solution. By continuing the agitation of the mixture to effect the reaction between the polyhydroxy phenolic material and the aldehyde, there is obtained a polymer condensate material as a separated liquid phase which wets in and encapsulates the platinum catalyst which is insoluble in the solution. Agitation of the mixture is continued to permit generation of polymeric condensate material and provide additional incorporation of platinum catalyst into the crosslinked polymeric resin.

Another preferred procedure to provide microencapsulation of platinum catalysts in a thermosetting polymeric resin is in accordance with the previously cited procedure of Hayford U.S. Pat. No. 4,444,699. A solution of a poly(acrylic acid) (PAA) and methylated methylolamine (MMM) in water is emulsified with platinum core material at a particular pH. The platinum catalyst can be added to the encapsulatiion solution with stirring, in a carrier such as a hydrocarbon solvent to form an emulsion having an average particle size of about 1 to 10 microns. Encapsulation of the platinum catalyst can be effected by adjusting the pH of the mixture and thereafter, heating the mixture for several hours at a temperature of about 40° to 95° C. to accelerate the polycondensation of the MMM.

In addition to the above methods for encapsulating the platinum catalyst with a thermosetting resin, the platinum catalyst of the present invention also can be encapsulated with thermoplastic polymers. Thermoplastic encapsulation methods which can be used to make the microencapsulated platinum catalyst of the present invention are shown by Morishita et al, U.S. Pat. No. 3,859,228, Samejima et al U.S. Pat. No. 4,462,982, and Samejima et al U.S. Pat. No. 4,411,933 which are incorporated herein by reference. A typical micro encapsulation procedure for encapsulating the platinum catalyst with these thermoplastic encapsulation methods, is by dissolving or dispersing the platinum catalyst in finely divided form as particles or droplets into a solution of the thermoplastic encapsulate. The solvent containing the encapsulant and the platinum catalyst is then dispersed in a continuous phase processing medium. A portion of the solvent is then evaporated to precipitate the encapsulant around the catalyst. A coating around the particles or droplets of the catalyst can be formed and thereafter solidified. Some of the thermoplastic polymers which can be used are polyethylene, polystyrene, polyacrylates, and styrene acrylonitrile copolymer.

The olefinically unsaturated organopolysiloxane, hereinafter referred to as "vinylsiloxane" utilized in the one part heat curable organopolysiloxane compositions of the present invention can have a viscosity of from about 100 to 200,000 centipoises. A preferred vinyl siloxane is included within the following formula:

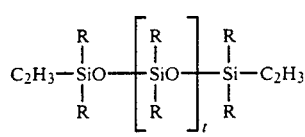
(1)

where $C_2H_3$ is vinyl, and R is selected from $C_{(1-13)}$ monovalent hydrocarbon radicals free of olefinic unsaturation, and t is a positive integer having a value sufficient to provide a vinyl siloxane viscosity of from about 100 to 200,000 centipoises at 25° C. Preferably, R is selected from alkyl radicals of 1 to 8 carbon atoms, such as methyl, ethyl, propyl; mononuclear aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula,

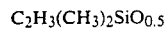

which can vary from about 0.05 to about 3.5, mol percent, based on the total chemically combined siloxy units and preferably from 0.14 to about 2 mole percent.

The vinylsiloxane of Formula (1) is generally prepared by equilibrating the appropriate cyclotetrasiloxane with appropriate vinyl terminated low molecular weight polysiloxane chain-stoppers. The chain-stopper is preferred for such equilibration reaction and is preferably a low molecular weight vinyl terminated organopolysiloxane such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper is equilibrated with octamethylcyclotetrasiloxanes with the appropriate substitute groups in the presence of a catalyst to produce the desired vinyl siloxane having a viscosity varying from 100 to 200,000 centipoises at 25° C. The catalyst that is utilized is preferably a mild acid catalyst, such as toluenesulfonic acid or an acid treated clay such as Filtrol, which is a sulfuric acid activated clay manufactured and sold by Filtrol Corporation of Los Angeles, Calif. When the equilibration has proceeded to the point where about 85% of the cyclopolysiloxanes have been converted to the linear polymer, the acid catalyst is neutralized with a base or simply filtered out in the case of the acid activated clay to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

Included within the organohydrogenpolysiloxane, or "silicon hydride" is a "coupler", having the formula,

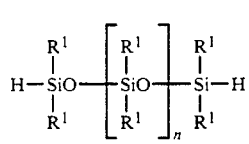
(2)

where $R^1$ is selected from $C_{(1-13)}$ monovalent hydrocarbon radicals free of olefinic unsaturation and n is an integer having a value sufficient to provide the "coupler" with a viscosity of 1 to 500 centipoises at 25° C. and from about 3 to 9 mole percent of chain-stopping diorganohydride siloxy units, based on the total moles of chemically combined siloxy units in the silicon hydride.

In addition to the silicone hydride coupler of formula (2), the silicon hydride used in the heat curable polysiloxane compositions of the present invention also can include silicon hydride resins consisting essentially of the following chemically combined units,

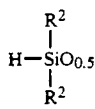

chemically combined with $SiO_2$ units, where the $R^2+H$ to Si ratio varies from 1.0 to 2.7. Silicon hydride resin also can have units of the formula,

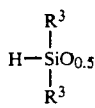

chemically combined with $SiO_2$ units and $(R^4)_2SiO$ units, where the $R^3+R^4+H$ to Si ratio varies from 1.2 to 2.7, where $R^2$, $R^3$ and $R^4$ are $C_{(1-13)}$ monovalent hydrocarbon radicals free of olefinic unsaturation selected from $R^1$ radicals.

The silicon hydride can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resin are shown by Jeram, U.S. Pat. No. 4,040,101 which is hereby incorporated by reference.

The silicon hydride also can include linear hydrogen containing polysiloxane having the formula,

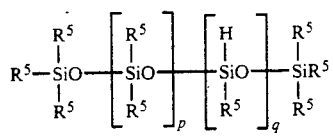

where $R^5$ is a $C_{(1-13)}$ monovalent hydrocarbon radical free of olefinic unsaturation, selected from $R^1$ radicals, and p and q are integers having values sufficient to provide a polymer having a viscosity of from 1 to 1,000 centipoises at 25° C., and wherein the polysiloxane has from 0.04 to 1.4 by weight of hydrogen.

The silicon hydride of formula (3) can be produced by equilibrating the appropriate hydrogencyclopolysiloxane with the appropriate cyclopolysiloxane containing $R^5$ substituent groups, in combination with low molecular weight linear triorganosiloxy end-stopped chain-stoppers.

In formulas (2) and (3) and the chemically combined units described above, $R^1$, $R^2$, $R^3$, $R^4$ and $R^5$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The hydride coupler is prepared by either a hydrolysis process or by acid catalyzed equilibration process. In the equilibration process the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (2) above. When the hydride coupler is produced, it can be separated from the undesirable amount of cyclics by stripping.

There may be incorporated in the heat curable organopolysiloxane compositions of the present invention from 5 to 100 parts by weight of a filler based on a 100 parts of the vinyl siloxane. A filler can be selected from fumed silica, precipitated silica and mixtures thereof. Preferably less than 50 parts by weight of filler, per 100 parts by weight of the vinyl siloxane is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 200° C. and preferably 135° C. to 150° C.

In order that those skilled in the art will be better able to practice the present invention, the following examples are given by way of illustration and not by way of limitation. All parts are by weight.

EXAMPLE 1

Several platinum catalysts were encapsulated with thermo setting resins in accordance with the procedure of either Hart et al, U.S. Pat. No. 3,755,190 based on a polyhydroxy phenolic/aldehyde polymerization or in accordance with the procedure of Hayford U.S. Pat. No. 4,444,699 utilizing the reaction between melamine and formaldehyde and/or poly condensation of monomeric methylolmelamine or etherified methylolmelamine, or a low molecular weight polymer thereof. The microcapsules of platinum catalyst made in accordance with the aforementioned procedures had an average capsule size of between about 4–60 microns and were either a brown color, if encapsulated by using a phenol formaldehyde thermoset reaction in accordance with Hart et al, or a white color if the method of Hayford were used employing a melamine and a formaldehyde or similar thermo setting reactions. A hydrocarbon solvent, such as VM&P naphtha (ligroin), or toluene was used in combination with the platinum catalyst to form an emulsion with the polymerizing ingredients in water which constituted a major part of the core material. The following results were obtained where "Karstedt" is 5% by weight platinum with divinyl tetramethyldisiloxane in xylene, "Ashby" is 1.7% by weight platinum in cyclotetramethyl tetravinyltetrasiloxane, Lamoreaux is 3.8% Pt in octanol.

TABLE I

| Core Material | Capsule Core Wt % | Capsule Size | Color |
|---|---|---|---|
| 1 g Karstedt Catalyst 85 g Xylene | 80 | 5-60 | white |
| 2.08 g Ashby Catalyst 112.2 g VM&PS naphtha | 86 | 4-50 | white |
| 1.5 g Karstedt Catalyst 56.6 VM&P naphtha + 65.2 g toluene | 79 | 7-50 | brown |
| 2 g Lamoreaux Catalyst 112.2 g VM&P naphtha | 81 | 4-50 | white |

A mixture of 6 grams of a vinyl/polydimethylsiloxane having a viscosity of 500 centipoise, a vinyl weight percent of 1.65 and consisting essentially of dimethylsiloxy units and methylvinyl siloxy units and 0.67 grams of a polydimethylhydrogensiloxane having a viscosity of 150 centipoise and a H weight percent of 0.8 was divided into four equal parts. There was added to each the four aliquots, 82 ppm platinum corresponding to the above shown platinum catalyst. The following mixtures were obtained:

TABLE II

| Sample | Catalyst | grams in Stock Solution |
|---|---|---|
| 1 | Karstedt (White) | .176 |
| 2 | Ashby | .308 |
| 3 | Karstedt (Brown) | .17 |
| 4 | Lamoreaux | .152 |

Upon standing at room temperature, for a period of up to four days samples 2 and 3 gelled, while samples 1 and 4 remained stable. Samples 1 and 4 were placed in an oven at 120° C. and sample 1 gelled in five minutes, and sample 4 gelled after 24 hours. Samples 1-4 were also subjected to DSC analysis. The following results were obtained:

TABLE III

| Sample | Onset of DSC Exotherm (°C.) |
|---|---|
| 1 | 224 |
| 2 | 81 |
| 3 | 75 |
| 4 | 227 |

The above results show that DSC can predict the performance of the latent platinum catalyst. In addition, the DSC exotherm is consistent with the stability results of samples 2 and 3 as discussed above.

EXAMPLE 2

A stock formulation was prepared using 10 grams of a vinylsiloxane having a viscosity of 750 centipoise and consisting essentially of chemically combined methylvinyl siloxy units, diphenylsiloxy units, and end stopped with dimethylvinylsiloxy and trimethylsiloxy units with 0.2 grams of siliconhydride having 0.24 weight percent of hydrogen and consisting essentially of chemically combined dimethylsiloxy units, methylhydrogen siloxy units and end stopped with dimethylhydrogensiloxy units and trimethylsiloxy units. Aliquots of the stock mixture were then combined with the respective encapsulated catalysts of example 1 to provide curable formulations having 20 ppm of platinum catalyst. In one formulation the white Karstedt catalyst was used at 100 ppm. Gel times of the various heat curable mixtures were determined at a period of up to 30 days at a temperature of 70° C. The following results were obtained:

TABLE 4

| (20 ppm Pt) Catalyst | Gel Free Time at 70° C. (days) |
|---|---|
| Karstedt (White) | 30 |
| Ashby | 30 |
| Karstedt (Brown) | 7 |
| Lamoreaux | 30 |
| Karstedt (White) 100 ppm Pt | 6 |

The above results show that the various catalysts exhibit satisfactory shelf stability at moderately elevated temperatures for an extended period of time. A shorter gel free time at 70° C. is shown when the concentration of the catalyst increased to 100 ppm.

An additional study was made to determine to what degree the cure rate was enhanced at elevated temperatures with the above described curable mixture temperatures in the range of from 135° to 210° C. The following results were obtained:

TABLE 5

| (20 ppm) Catalyst Pt | Gel Time (Min.) | °C. |
|---|---|---|
| Karstedt (White) | 15 | 135 |
| " | 10 | 150 |
| Ashby | 15 (10% gel) | 175 |
| Karstedt (Brown) | 15 | 150 |
| Lamoreaux | 60 (no gel) | 210 |
| Karstedt (White) 100 ppm Pt | 15 | 135 |

The above results show that the curable organopolysiloxane composition containing the Karstedt (White) catalyst has the best overall performance characteristics with respect to extended shelf stability at moderate temperatures and a fast gel time at elevated temperatures. The Lamoreaux catalyst is shown to have the lowest activity. The result is consistent with the higher exotherm shown in Table 3. A further possible explanation is that the heat curable mixture used contained a vinylsiloxane having chemically combined diphenylsiloxy units and a lower level of platinum.

Although the above examples are directed to only a few of the very many variables which can be used in the practice of the present invention, it should be understood that the present invention is directed to a much broader variety of heat curable organopolysiloxane compositions utilizing various platinum catalysts encapsulated with both thermosetting resins and thermoplastic resins as well as a broader variety of olefinically unsaturated organopolysiloxanes and organohydrogenpolysiloxanes as set forth in the description preceding these examples.

We claim:

1. A one part heat curable organopolysiloxane composition comprising by weight,
   (A) 100 parts of an organopolysiloxane having at least two olefinically unsaturated organic radicals
   (B) 1 to 20 parts of an organohydrogenpolysiloxane, and
   (C) an effective amount of a platinum catalyst microencapsulated in an organic polymer selected from the class consisting of a phenolformaldehyde resin, a melamineformaldehyde resin, a polyacrylic acidpolycondensed methylated methylolamine product, a polyethylene, a polystyrene, a polyacrylate and a poly(styrene-acrylonitrile copolymer).

2. A one part heat curable organopolysiloxane composition in accordance with claim 1, where the platinum catalyst is microencapsulated in a thermoplastic organic polymer selected from the class consisting of polyethylene, polymethylmethacrylate, polystyrene, and poly(styrene-acrylonitrile).

3. A one part heat curable organopolysiloxane composition in accordance with claim 1, where the platinum catalyst is microencapsulated in a thermosetting organic polymer selected from the class consisting of a phenolformaldehyde resin, and a melamineformaldehyde resin.

4. A one part heat curable organopolysiloxane composition in accordance with claim 2, where the thermoplastic organic polymer is polymethylmethacrylate.

5. A one part heat curable organopolysiloxane composition in accordance with claim 2, where the thermoplastic organic polymer is a poly(styrene-acrylonitrile) copolymer.

6. A one part heat curable organopolysiloxane composition in accordance with claim 2, where the thermoplastic organic polymer is a polystyrene.

7. A one part heat curable organopolysiloxane composition in accordance with claim 2, where the thermosetting organic polymer is a phenolformaldehyde resin.

8. A one part heat curable organopolysiloxane composition in accordance with claim 3, where the thermosetting organic polymer is a melamine formaldehyde resin.

9. A one part heat curable organopolysiloxane composition in accordance with claim 1, where the organopolysiloxane is a vinyl substituted polydimethylsiloxane.

10. A one part heat curable organopolysiloxane composition in accordance with claim 9, where the organopolysiloxane is a vinyl terminated polydimethylsiloxane.

* * * * *